United States Patent
Krauss et al.

(10) Patent No.: US 7,802,967 B2
(45) Date of Patent: Sep. 28, 2010

(54) VERTICAL AXIS SELF-BREAKING WIND TURBINE

(76) Inventors: Frenchy Krauss, 4721 Floramar Terr., New Port Richey, FL (US) 34652; Wolfgang P Schaller, Hrumbacher Str. 2, Waltenhausen (DE) D-868480

( * ) Notice: Subject to any disclaimer, the term of this patent is extended or adjusted under 35 U.S.C. 154(b) by 109 days.

(21) Appl. No.: 12/196,457

(22) Filed: Aug. 22, 2008

(65) Prior Publication Data

US 2009/0060744 A1  Mar. 5, 2009

Related U.S. Application Data

(60) Provisional application No. 60/957,778, filed on Aug. 24, 2007.

(51) Int. Cl.
*F03D 3/00* (2006.01)
(52) U.S. Cl. .................. 416/203; 415/4.2; 415/4.4; 416/243
(58) Field of Classification Search ............. 415/4.2, 415/4.4, 907, 4.1; 416/197 A, DIG. 6, 132 R, 416/183, 243, 132 B, 203; 290/44, 55
See application file for complete search history.

(56) References Cited

U.S. PATENT DOCUMENTS

| | | | | |
|---|---|---|---|---|
| 1,485,649 | A | * | 3/1924 | Van Leggelo ............ 416/183 |
| 4,313,710 | A | | 2/1982 | La Ferte |
| 4,350,900 | A | | 9/1982 | Baughman |
| 4,359,311 | A | | 11/1982 | Benesh |
| 4,551,631 | A | | 11/1985 | Trigilio |
| 5,044,878 | A | * | 9/1991 | Wilhelm ................. 415/4.2 |
| 5,391,926 | A | | 2/1995 | Staley et al. |
| 5,852,331 | A | | 12/1998 | Girogini |
| 6,283,710 | B1 | | 9/2001 | Biscomb |
| 6,465,899 | B2 | * | 10/2002 | Roberts .................. 290/44 |
| 6,666,650 | B1 | | 12/2003 | Themel |
| 6,740,989 | B2 | | 5/2004 | Rowe |
| 6,841,894 | B2 | | 1/2005 | Gomez Gomar |
| 6,870,280 | B2 | | 3/2005 | Pechler |

(Continued)

FOREIGN PATENT DOCUMENTS

DE      10105570 A1 *   8/2002

(Continued)

*Primary Examiner*—Ninh H Nguyen
*Assistant Examiner*—Aaron R Eastman
(74) *Attorney, Agent, or Firm*—Maxey Law Office, PLLC; Stephen Lewellyn

(57) ABSTRACT

A vertical axis wind turbine which includes a rotor having three radially extending blades spaced at even intervals about a central axis. Each radially blade having an outer edge that lies on an imaginary circle of a first diameter. Each radially extending blade including a plurality of spaced airfoil sub-blades separated by gaps for the passage of air therethrough. Each of sub-blade having a leading vertical edge, and a trailing vertical edge and being positioned with the trailing vertical edge along a common radius line of the imaginary circle. Each sub-blade is skewed such that its cord line is rotated negative 45 degrees with respect the radius of the imaginary circle. The airfoil sub-blades maximize energy production by creating a secondary wind flow of a higher velocity for impingement upon blades of the rotor, and utilize backpressure during the second half of a rotation cycle to efficiently break the rotor against overspeed.

18 Claims, 7 Drawing Sheets

U.S. PATENT DOCUMENTS 7,329,965 B2 2/2008 Roberts et al.
2007/0269311 A1 11/2007 Browning

FOREIGN PATENT DOCUMENTS

| | | |
|---|---|---|
| DE | 10105570 B4 | 3/2005 |
| JP | 2002130110 | 5/2002 |
| JP | 2002235656 | 8/2002 |
| JP | 2005061318 | 3/2005 |

* cited by examiner

VERTICAL AXIS SELF-BREAKING WIND TURBINE

CROSS-REFERENCE TO RELATED APPLICATIONS

This application claims the benefit of U.S. Provisional Application No. 60/957,778 filed Aug. 24, 2007, the entire of which is incorporated herein by reference.

FIELD OF THE INVENTION

The present invention relates generally to wind turbines, and more particularly, relating to a vertical axis self-breaking wind turbine.

BACKGROUND OF THE INVENTION

As a result of the steadily increasing demand and cost of fossil fuels, and environmental factors related to the use of fossil fuels, the development of alternative and renewable energy sources is on the rise.

One area of particular attention is the conversion of wind energy into a useful form whether it be in the form of mechanical energy to drive a mechanical system such as a pump or in the form of electrical energy. Windmills have been used throughout the ages in converting wind energy into a useful form. There are two basic types of windmills or wind turbines, the horizontal axis windmill and the vertical axis wind turbine.

Vertical axis wind turbines have inherent advantages of stability due to gyroscopic action of the rotor, simplicity of design due to the avoidance of yaw mechanisms and blade controls, and strength of construction. However, the fact that the blades of the rotor are exposed to the force of the wind during only one-half of each cycle and then must be shielded from the wind to prevent creation of back pressure during the remaining half of each cycle has been a major problem. A variety of structural changes have been proposed in an effort to avoid or minimize formation of back pressure on the sails during their return sweep. These efforts have not been successful in overcoming the problems associated with the prior known vertical-axis wind machines. As a consequence, vertical-axis machines have not been commercially attractive and have not achieved substantial acceptance in competition with the horizontal-axis windmills.

The windmill construction which has been most commonly utilized for the generation of electricity is a plural-bladed propeller positioned vertically for rotation about a horizontal axis. This type of construction has been widely used because, when positioned into the wind, the entire surface of each blade of the propeller is exposed to the full force of the moving air. The commercial windmill industry has developed around the horizontal-axis construction and the aerodynamic principles and knowledge discovered in connection with atmospheric flight. Accordingly, it has become common practice to design such machines for the atmospheric/wind conditions of specific locations by varying the number and/or dimensions of the blades employed. The fewer the propeller blades, the more efficient the machines become at high wind speeds but the less efficient they are at lower wind speeds.

Because the blades of horizontal-axis windmills are coupled indirectly to an electric generator which is effective only at a constant design speed, and because the blades themselves become unsafe at high speeds, the horizontal-axis windmills have been capable of utilizing only a small percentage of the theoretically-available power in the wind. The multi-blade windmills have high starting torque at low wind speeds, harvesting up to 30% of the kinetic energy from the wind but become very inefficient at high wind speeds. The Dutch 4-blade machines, for instance, utilize only about 16% of the winds' kinetic energy. The most common and efficient windmills today are of the two and three blade types designed for high tip speed operation. These machines harvest roughly 42% of the theoretical 59.2% kinetic energy from the wind. Such windmills operate within a narrow window or range of wind velocities defined by a cut-in wind speed of 3-5 mps (meters/sec.) and a cut-out wind speed of about 25 mps. To maintain a near constant level of torque to drive the generator has required either: complex controls, in the case of pitch control, or intricate blade designs, in the case of stall control, both of which are expensive to build and maintain. In addition, such wind machines require yaw mechanisms with motors, gearboxes, cable twist counters, etc. to keep the machine yawed against the wind. These requirements have combined to make the horizontal-axis windmills economically unattractive except in areas where alternative forms of electricity generation are not readily available.

Today's windmill designs also have other drawbacks. They have problems with gyroscopic vibration when the machine veers with changing wind direction. They are vulnerable to high bending moments at the base or root of the blades as each blade passes by or into the wind-shade of the supporting mast as well as when being braked during tempest conditions. These bending moments lead to frequent blade replacements and high maintenance costs. Because of their massive structures, these machines, of necessity, are remotely located miles from the area of power usage, thus necessitating construction of expensive power grids to transport the energy produced to the point of consumption, (generally large cities). Consequently, an approximate eight to ten percent of the power generated never reaches its destination due to line and transformer losses. Lastly, because of opposition from environmentalists with regard to the esthetics in natural settings as well as prohibition from municipal regulating authorities due to safety hazards associated with these large-prop machines in populated areas, many areas which would be ideal for generating wind energy, such as atop large buildings, are simply off-limits due to opposing design constraints.

Accordingly, there is a need for a vertical axis wind turbine of an improved and simplified construction that can be utilized both in urban and rural settings, that does not depend upon wind direction or wind velocity for optimal energy production, and that utilizes the back pressure during the remaining half of a rotation cycle to apply a breaking force to the rotor of the turbine to prevent overspeed, while overcoming the drawbacks of prior vertical axis wind turbines.

SUMMARY OF THE INVENTION

The preferred embodiments of the present invention addresses this need by providing a vertical axis wind turbine having a rotor of an improved and simplified construction that more efficiently utilizes wind flow across the blades of the rotor to provide a secondary wind flow of an increased velocity against blades of the rotor, and which efficiently utilizes backpressure created by the rotor blades during the second half of a rotation cycle to break the rotor against overspeed. The specific rotor design of the wind turbine of present invention is compact and quiet making it suitable and desirable for use in urban settings, where the wind turbine may be installed on roof tops.

To achieve these and other advantages, in general, in one aspect, a wind turbine is provided comprising a rotor rotatable about a central axis, and including three radially extending blades spaced at even intervals about the central axis, each blade having an outer edge that lies on an imaginary circle of a first diameter, each radially extending blade including a plurality of spaced sub-blades separated by gaps for the passage of air therethrough, each of the sub-blades having a leading vertical edge, and a trailing vertical edge, each sub-blade of each radially extending blades being positioned with the trailing vertical edge along a common radius line of the imaginary circle.

In general, in another aspect, each sub-blade has a chord line extending between the leading vertical edge and the trailing vertical edge, and wherein each sub-blade is skewed such that the chord line is rotated negative 45 degrees with respect the radius of the imaginary circle.

In general, in another aspect, each sub-blade has a quarter-circular profile.

In general, in another aspect, the rotor further includes a central vertical support centered at the central vertical axis; and further wherein each sub-blade has a chord line extending between the leading vertical edge and the trailing vertical edge, and wherein each sub-blade is skewed such that the chord line is rotated negative 45 degrees with respect the radius of the imaginary circle.

In general, in another aspect, the central vertical support has a circular cross-section with a radius of 0.1 times the diameter of the imaginary circle; and further wherein each sub-blade has a quarter-circular profile with a radius equal to the radius of the central vertical support.

In general, in another aspect, a wind turbine is provided comprising a wind turbine, comprising a rotor rotatable about a central axis, and including three radially extending blades spaced at even intervals about the central axis, each blade having an outer edge that lies on an imaginary circle of a first diameter, each radially extending blade including a plurality of spaced sub-blades separated by gaps for the passage of air therethrough, each of the sub-blades having a leading vertical edge, and a trailing vertical edge, each sub-blade of each radially extending blades being positioned with the trailing vertical edge along a common radius line of the imaginary circle; and wherein each of the sub-blades are of a shape and are arranged such that air flowing through the gaps is accelerated and directed towards the sub-blades of the preceding radially extending blade in respect to the direction of rotation of the rotor.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Reference will now be made in detail to the preferred embodiments of the present invention, examples of which are illustrated in the accompanying drawings.

Figure 1:
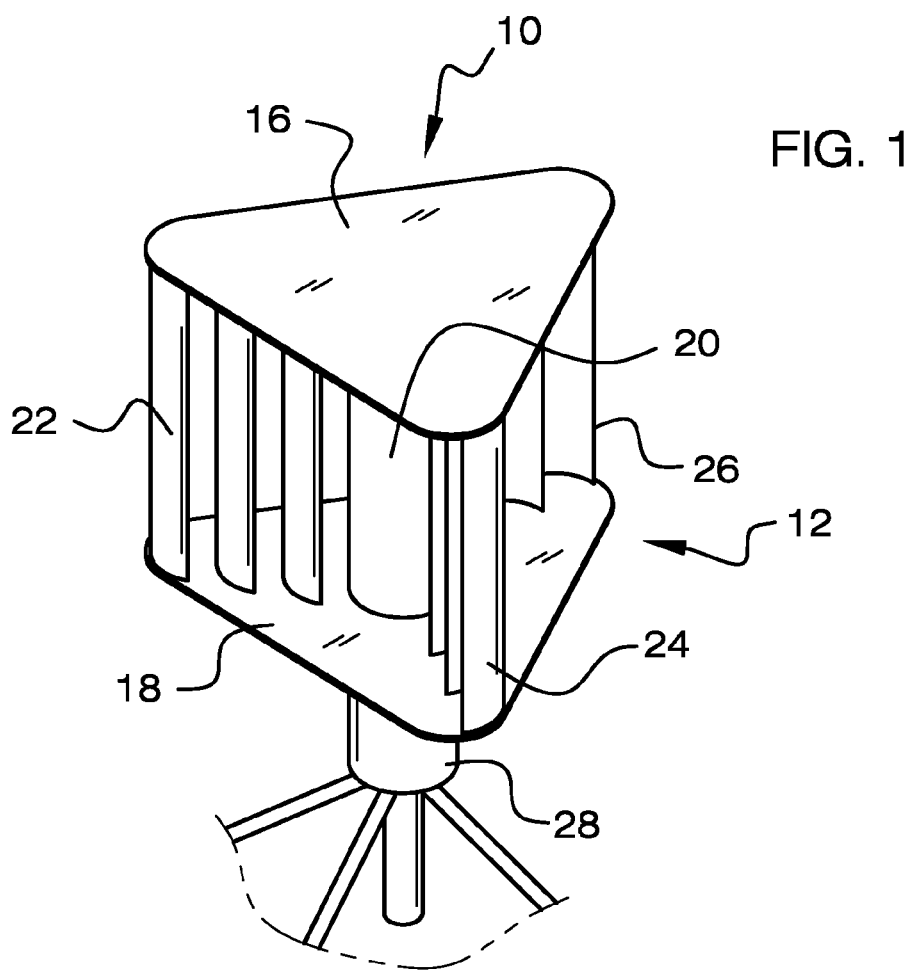
FIG. 1 is a diagrammatic perspective view of the vertical axis self-breaking wind turbine constructed in accordance with the principles of the present invention.
Figure 2:
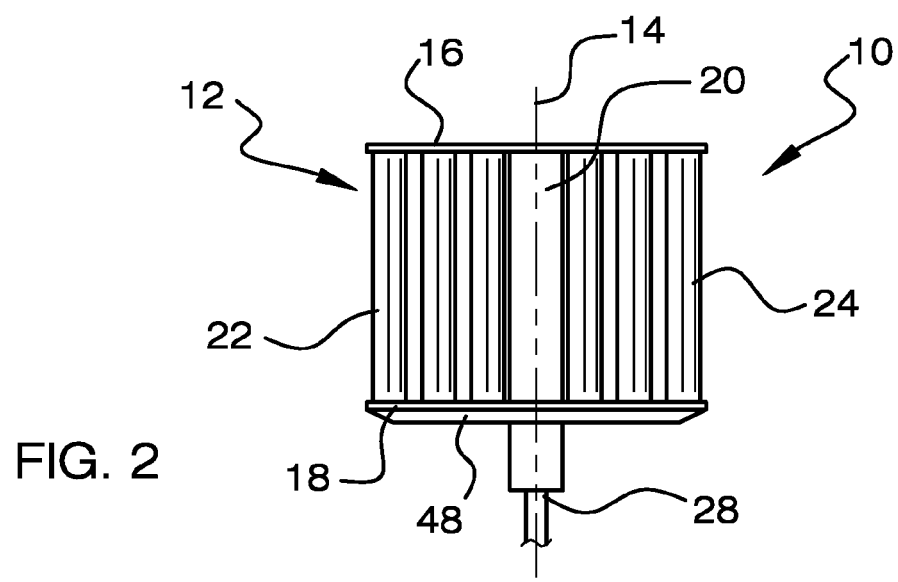
FIG. 2 is a diagrammatic front elevation of the vertical axis-self breaking wind turbine.

In FIGS. 1 and 2, there is shown a wind turbine 10 constructed in accordance with the principals of the present invention. The wind turbine 10 includes a rotor 12 mounted for rotation about a central axis 14 for converting wind energy into a useable form, such as for example, electrical energy or mechanical energy. While not shown, the wind turbine 10 may be operatively coupled to an electric generator to produce electrical power for any number of applications, such as providing power to a residential home. Likewise, the wind turbine 10 may be operatively coupled to any number of mechanical systems for providing motive power to the system. For example, the wind turbine 10 may be operatively coupled to a pump used for pumping water from a well. For purpose of discussion and illustration, the central axis 14 is described as being a vertical axis. However, this is not meant to preclude the wind turbine 10 from having a different axis of rotation.

Rotor 12 may be arranged for rotation with respect to a support member 28 in any suitable fashion. Support structures of varying designs may be desired depending upon the size of the rotor 12. Rotor 12 includes a triangular upper end plate 16 and triangular lower end plate 18 interconnected by a central support 20, and a plurality of radially extending blades 22, 24, and 26.

Figure 3:
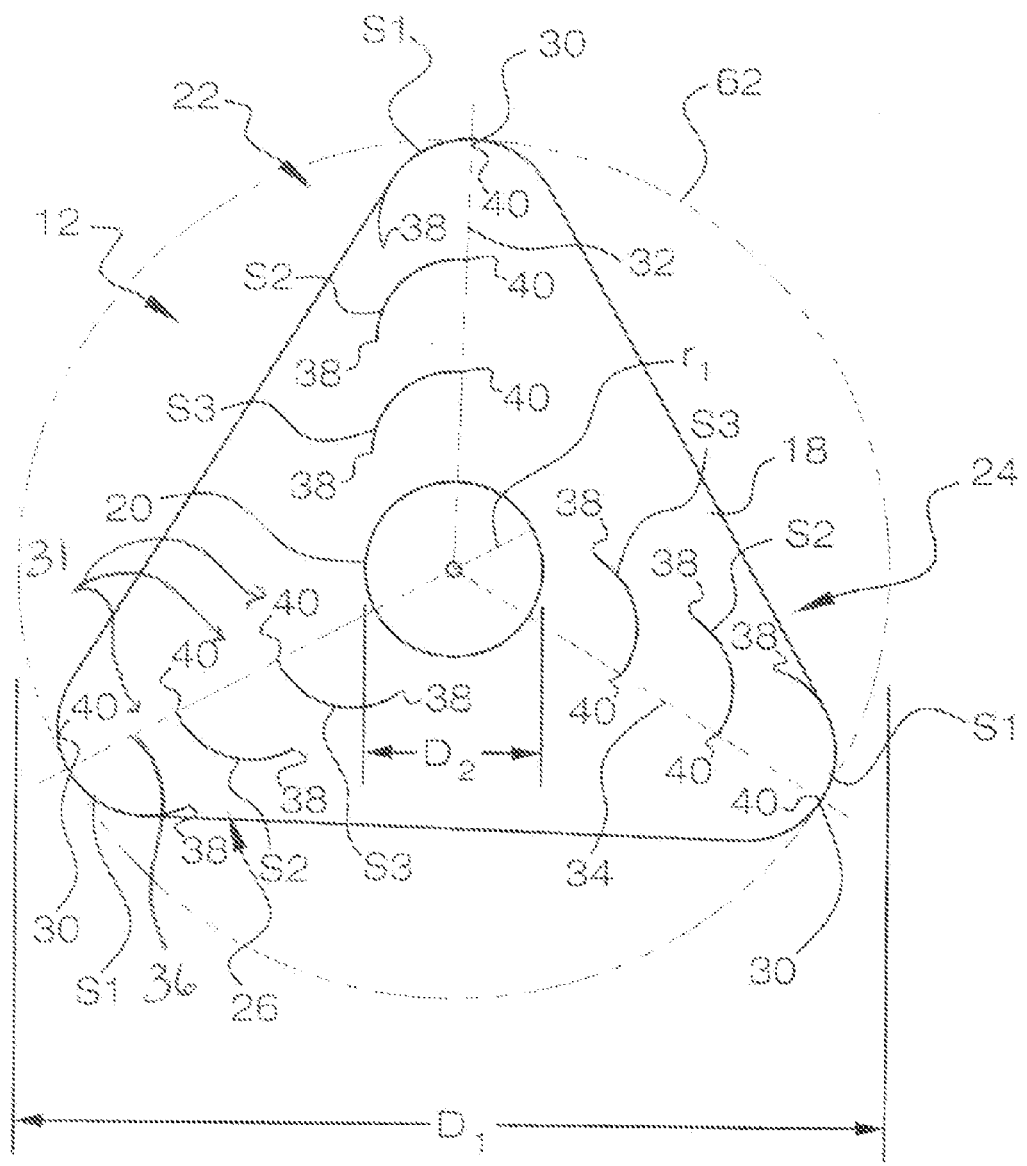
FIG. 3 is a horizontal cross-sectional showing the rotor construction.
Figure 4:
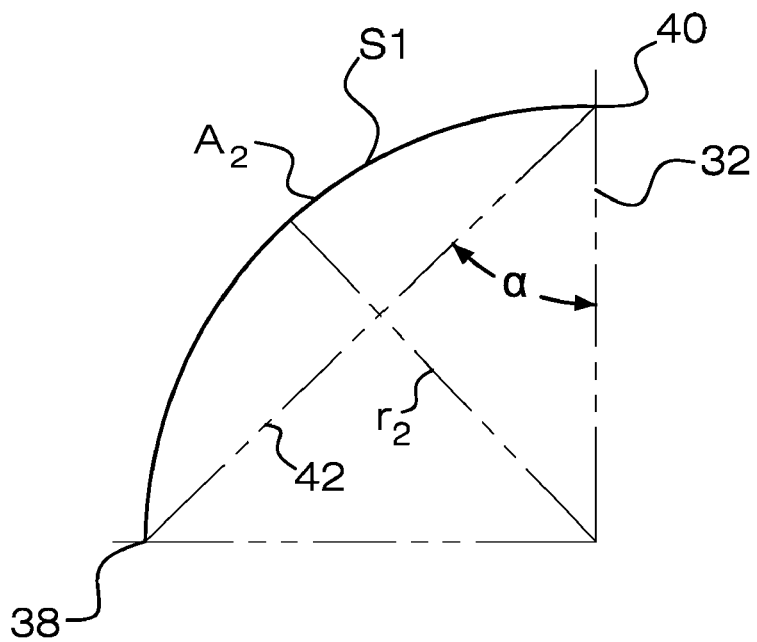
FIG. 4 shows the geometrical detail of a sub-blade of a first configuration.

In FIGS. 3 and 4, blades 22, 24 and 26 are positioned symmetrically about the central axis 14, and subdivide the rotor 12 into three equisized sectors. Each blade 22, 24 and 26 has an outer edge 30 that lies on the circumference of an imaginary circle 62 of a diameter D1 whose magnitude is variable since the rotor 12 may be constructed in various sizes. Circle 62 is centered on the central axis 14. For the purpose of this specification, measurements of the wind turbine 10 will be expressed in terms of diameter D1 of circle 62. Blades 22, 24 and 26 are positioned on radii 32, 34, and 36 of circle 62 respectively at 120 degree intervals around central axis 14.

Each blade 22, 24, and 26 is vertically subdivided into multiple airfoil sub-blades S1, S2, and S3. Each blade 22, 24 and 26 may be divided into more or less sub-blades. Sub-blades S1, S2 and S3 are spaced forming vertical slots or gaps 31 between adjacent sub-blades S1 and S2, S2 and S3, and between sub-blade S3 and central support 20 through which air can pass. Each sub-blade S1, S2, and S3 includes a leading vertical edge 38, a trailing vertical edge 40 and a chord line 42 extending therebetween. The trailing vertical edge 40 of each sub-blade S1, S2, and S3 of each blade 22, 24 and 26 is positioned along radii 32, 34 and 36 respectively, such that each vertical edge 40 lies in a common vertical plane at an equal spaced distance. The spacing between sub-blades S1 and S2, S2 and S3, and between sub-blade S3 and central support 20 are equal, which can be expressed in terms of 0.4D1 divided by the total number of sub-blades. The sub-blade S1, S2, and S3 are skewed with the chord line 42 rotated through an angle $\alpha$ a of about −45 degrees with respect to the radii 32, 34 and 36 respectively.

With continued reference to FIG. 3, each sub-blade S1, S2, and S3 is preferably quarter-circular shape in cross-section. Sub-blades S1, S2, and S3 have a radius of curvature $r_2$, which may be expressed as approximately equal to $0.1D_1$, which also represents the radius $r_1$ of central support 20. Sub-blades S1, S2, and S3 have an arc length $A_L$, which may be expressed as approximately equal to $0.16D_1$, which also represents one-quarter of the circumference of central support 20.

Figure 6A:
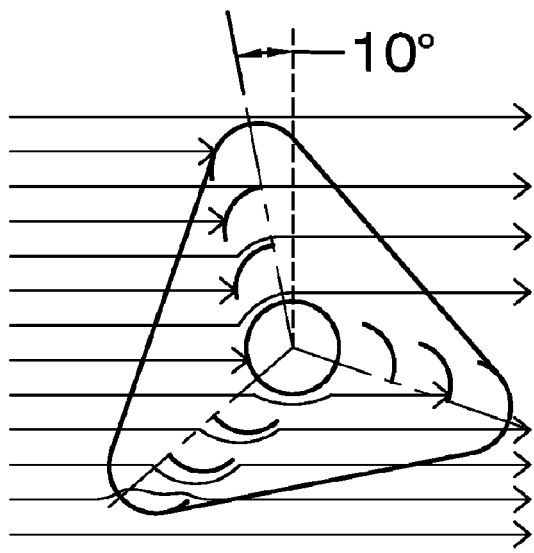
FIGS. 6a-6i are graphic representations of the wind flow about the rotor construction through a complete 360 degree rotation cycle.
Figure 6B:
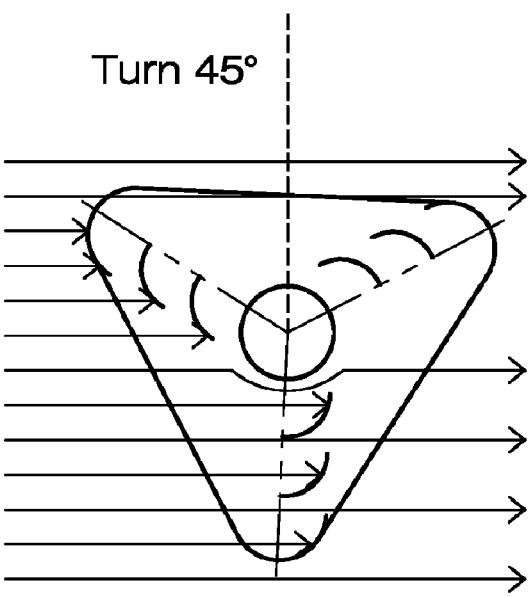
Figure 6C:
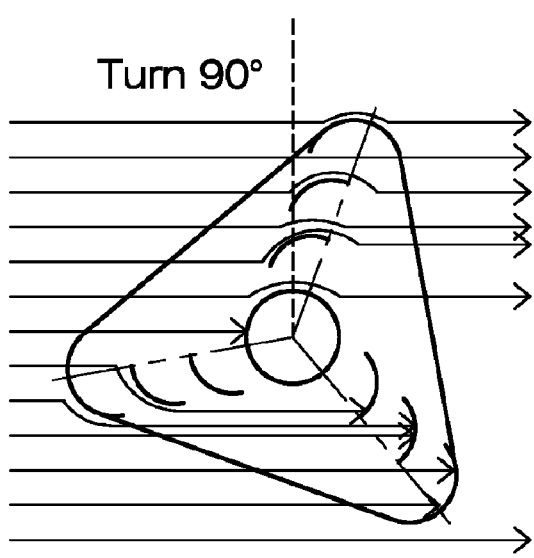
Figure 6D:
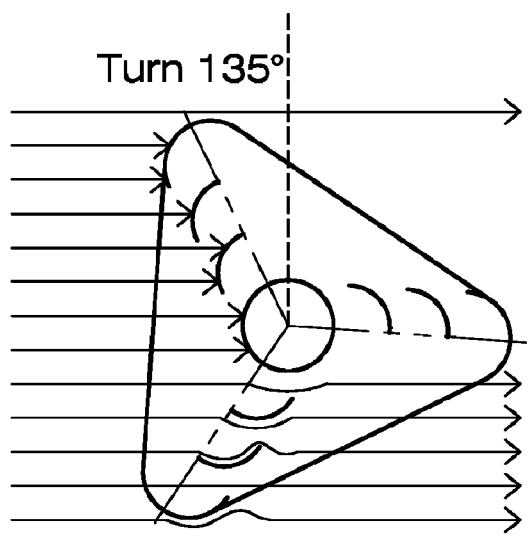
Figure 6E:
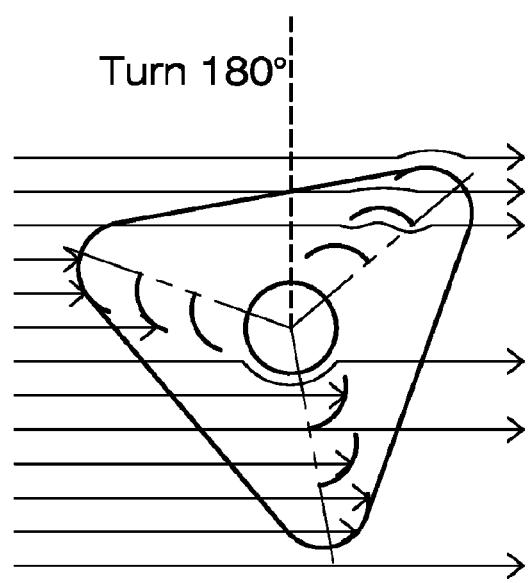
Figure 6F:
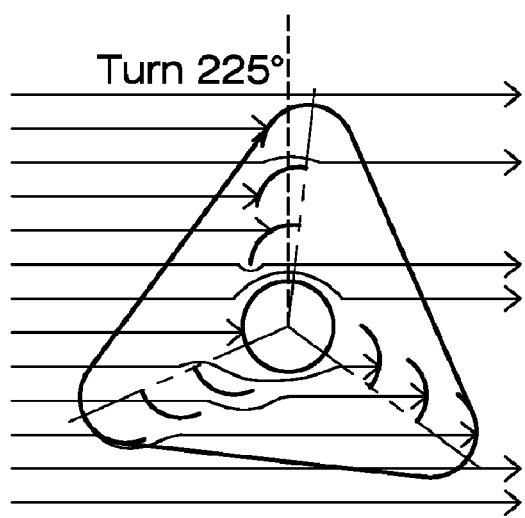
Figure 6G:
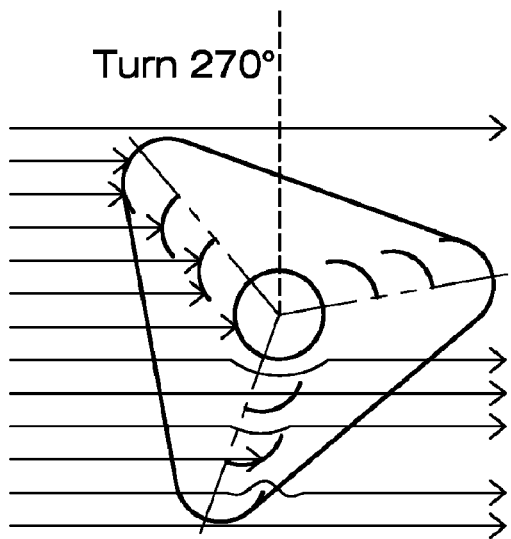
Figure 6H:
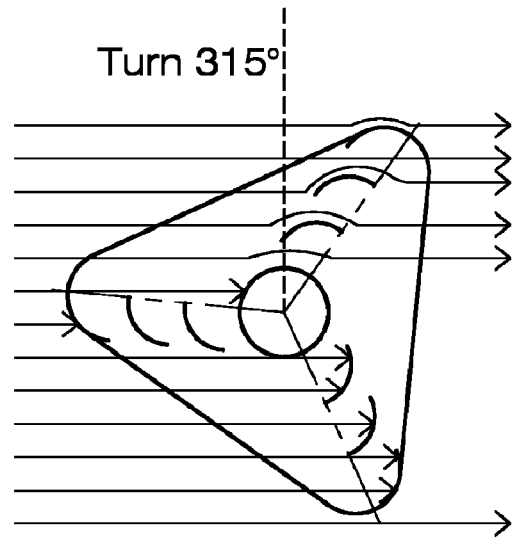
Figure 6I:
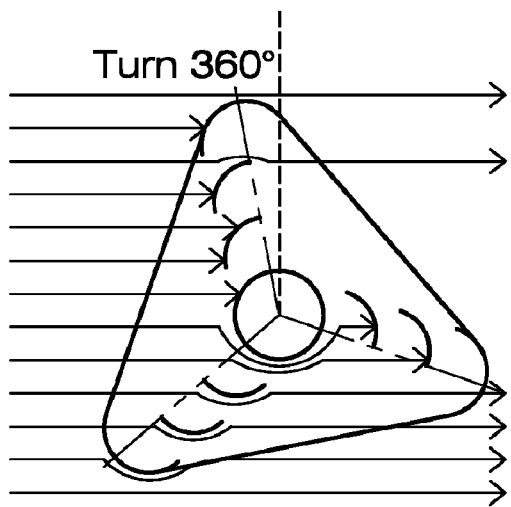

As can be further seen, the vertical slots or gaps 31 between adjacent sub-blades S1 and S2, S2 and S3, and between sub-blade S3 and central support 20 decrease in the direction of rotation from the trailing vertical edges 40 towards the leading vertical edges 38. As wind flows through the gaps 31 its velocity is increased as a result of a throttling effect created by the narrowing space. As the wind continues to flow, exiting the slots or gaps 31, it may be directed towards a corresponding sub-blade of the preceding blade in the direction of rotation (FIG. 6c). This throttle effect increases the wind velocity impinging against the sub-blades of the preceding blade which are positioned in rotation to most efficiently capture the wind flow and create a higher torque moment than would be created in absence of the throttling effect.

Central support 20 has circular cross-section of a diameter $D_2$ and is centered on the central axis 14. The central support diameter $D_2$ is approximately equal to $0.2D_1$. Central support 20 may be solid or of a hollow tubular construction to better resist rotational moments and to prevent buckling of the central support.

Figure 5:
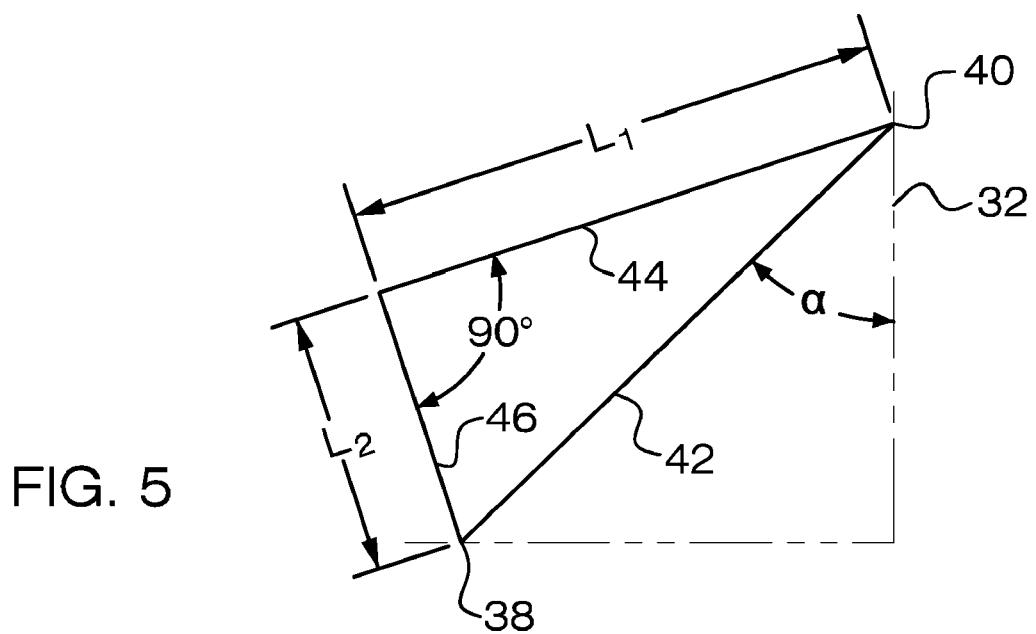
FIG. 5 show the geometrical detail of a sub-blade of a second configuration.

While less desired, it is contemplated each sub-blade may have a L-shape profile with a long leg 44 having a length $L_1$ and a short leg 46 having a length $L_2$, as shown in FIG. 5. Short leg 46 length $L_2$ may be approximately equal to $0.4L_1$ and $L_1+L_2$ is approximately equal to $0.16D_1$, where $L_1$ is approximately equal to $0.11D_1$. This profile is less desired over the preferred semi-circular profile because the sharp edges of the L-shape profile creates more drag against the rotation of the rotor 12.

The graphical representation of FIGS. 6a-6i depict the direction of wind, as indicated by the lined arrows, as it flows across blades 22, 24, 26 and sub-blades S1, S2, and S3 of the present invention through a 360 degree rotation cycle. Through this graphical representation, those skilled in the art can understand and how the torque or spin moments would appear through rotation of the rotor 12. The self-braking aspect of the rotor 12 will also become apparent, which is a result of the particular construction of rotor 12 which prevents overspeed. This is significant advantage over prior wind turbines which require additional mechanical systems to act against the rotation of the rotor to prevent overspeed. Further, the self-braking design of rotor 12 of the present invention permits the wind turbine 10 to be used in higher wind velocities than previously capable in prior wind turbines.

Figure 7:
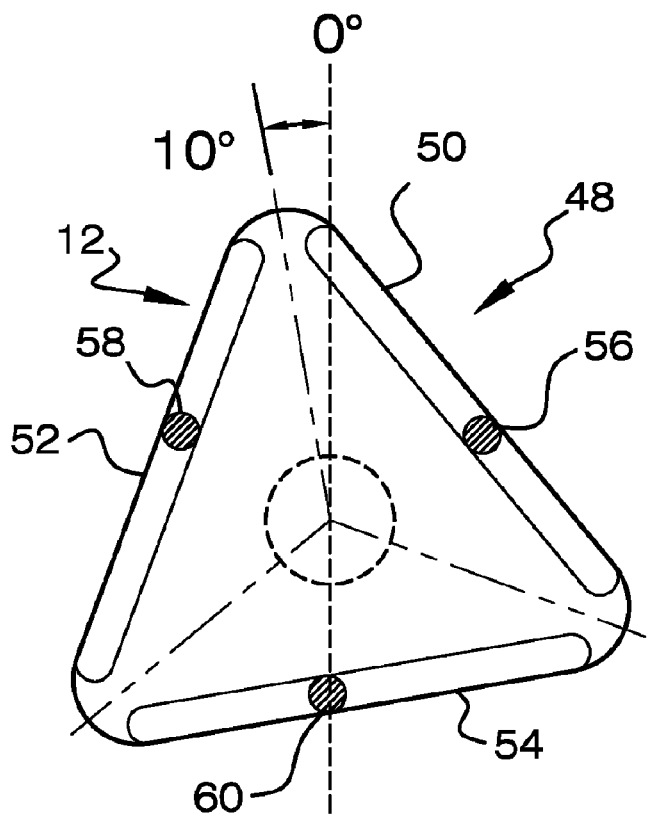
FIG. 7 is a graphic representation of a torsional damper in connection with the rotor at a first angular rotation.
Figure 8:
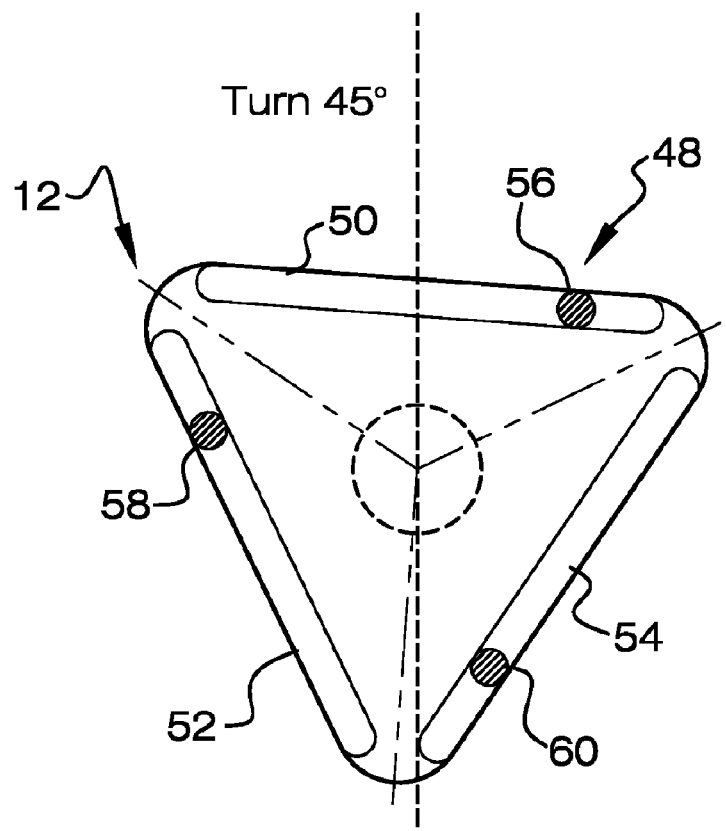
FIG. 8 is the graphic representation of FIG. 7 at a second angular rotation.

In FIGS. 7 and 8, the rotor 12 is fitted with a torsional damper 48 to absorb torsional vibration generated in the rotor as a result of non-equal torque moments created at each blade 22, 24 and 26 through a 360 degree rotation cycle as each blade transitions into and out of the direction of wind flow. The torsional damper 48 operates to smooth and eliminate output torque pulsations by transitionally optimizing the torque moments of blades 22, 24, and 26 in direct alignment or at their maximum angles of attack with respect to the relative wind flow throughout the rotor 12 and provide balance, strength, and stabilization to the entire rotor element.

Torsional dampers are well known in the art, and one of ordinary skill in the field would be readily capable of selecting a torsion damper of a particular construction and operation to suite the particular needs of the wind turbine 10 of the present invention. However, for exemplary purposes only, the torsional damper 48 herein is operatively coupled to rotor 12, and includes three equal sized closed ended tubes 50, 52, and 54 arranged symmetrically about the central axis 14, and generally forming a triangle configuration as shown. Freely movable weights 56, 58, and 60 are positioned into tubes 50, 52 and 54 respectively for reciprocation therein. The conservation of rotational momentum causes the weights 56, 58 and 60 to slide within the closed ended tubes 50, 52, and 54 to absorb and release rotational moment from and into the rotor 12 as the rotor 12 experiences torque surges. Through this graphical representation of FIGS. 7 and 8, those skilled in the art can understand how movement of the weights 56, 58 and 60 will act to conserve the rotational momentum of the rotor 12, and how the weights will absorb and release torque moments from and into the rotor.

The choice of materials among strong, dimensionally stable metals, composites, etc. will involve a compromise between: light materials which can minimize start-up inertia of the rotor 12 and enhance the response to light winds; and heavier materials which can make the rotor act somewhat as a flywheel and dampen the effect of wind gusts. In either case, the rotor components should be manufactured to close tolerances and be dynamically balanced to minimize structural noise and vibration. The present wind turbine 10 has been designed to accommodate different methods of assembly, either in the factory, when practicable, or at the installation site when shipping and handling costs make this advisable.

A number of embodiments of the present invention have been described. Nevertheless, it will be understood that various modifications may be made without departing from the spirit and scope of the invention. Accordingly, other embodiments are within the scope of the following claims.

What is claimed is:

1. A wind turbine, comprising:
   a rotor rotatable about a central axis, and including three radially extending blades spaced at even intervals about said central axis, each blade having an outer edge that lies on an imaginary circle of a first diameter, each radially extending blade including a plurality of spaced sub-blades separated by gaps for the passage of air therethrough, each of said sub-blades having a leading terminal vertical edge, and a trailing terminal vertical edge, each sub-blade of each radially extending blades being positioned with said trailing terminal vertical edge along a common radius line of said imaginary circle; and wherein each sub-blade has a quarter-circular profile.

2. The wind turbine of claim 1, wherein each sub-blade has a cord line extending between said leading vertical edge and said trailing vertical edge, and wherein each sub-blade is skewed such that said chord line is rotated negative 45 degrees with respect the radius of said imaginary circle.

3. The wind turbine of claim 1, wherein said rotor further includes a central vertical support centered at a central vertical axis; and further wherein each sub-blade has a chord line extending between said leading vertical edge and said trailing terminal vertical edge, and wherein each sub-blade is skewed such that said chord line is rotated negative 45 degrees with respect the radius of said imaginary circle.

4. The wind turbine of claim 3, wherein said central vertical support has a circular cross-section with a radius of 0.1 times the diameter of said imaginary circle; and further wherein each sub-blade has a quarter-circular profile with a radius equal to said radius of said central vertical support.

5. The wind turbine of claim 4, wherein each sub-blade has a length that is approximately equal to 0.16 times the diameter of said imaginary circle.

6. The wind turbine of claim 3, wherein the spacing between said vertical terminal trailing edges of each sub-blade is equal.

7. The wind turbine of claim 3, further comprising:
a means to maintain the rotational momentum of said rotor.

8. The wind turbine of claim 1, further comprising:
a means to maintain the rotational momentum of said rotor.

9. A wind turbine, comprising:
a rotor rotatable about a central vertical axis;
said rotor including a pair of spaced horizontal plates, a vertical support centered at said central vertical axis and extending between said horizontal plates, including three radially extending blades spaced at even intervals about said central axis, each radially extending blade having an outer edge that lies on an imaginary circle of a first diameter;
said central vertical support has a circular cross-section of a second diameter;
each of said radially extending blades including a plurality of spaced sub-blades separated by gaps for the passage of air therethrough, each of said sub-blades having a leading terminal vertical edge, and a trailing terminal vertical edge, each sub-blade of each radially extending blades being positioned with said trailing terminal vertical edge along a common radius line of said imaginary circle, each sub-blade having a chord line extending between said leading terminal vertical edge and said trailing terminal vertical edge, and wherein each sub-blade is skewed such that said chord line is rotated negative 45 degrees with respect the radius of said imaginary circle; and wherein each sub-blade has a quarter-circular profile with a radius approximately equal to 0.01 times said diameter.

10. The wind turbine of claim 9, wherein each sub-blade has a length that is approximately equal to 0.016 times said first diameter.

11. The wind turbine of claim 9, further comprising:
a means to maintain the rotational momentum of said rotor.

12. The wind turbine of claim 9, wherein said second diameter is approximately equal to 0.2 times said first diameter.

13. A wind turbine, comprising:
a rotor rotatable about a central axis, and including three radially extending blades spaced at even intervals about said central axis, each blade having an outer edge that lies on an imaginary circle of a first diameter, each radially extending blade including a plurality of spaced sub-blades separated by gaps for the passage of air therethrough, each of said sub-blades having a leading terminal vertical edge, and a trailing terminal vertical edge, each sub-blade of each radially extending blades being positioned with said trailing terminal vertical edge along a common radius line of said imaginary circle; and
wherein each of said sub-blades are of a shape and are arranged such that air flowing through the gaps is accelerated and directed towards the sub-blades of the preceding radially extending blade in respect to the direction of rotation of said rotor.

14. The wind turbine of claim 13, wherein each sub-blade has a chord line extending between said leading terminal vertical edge and said trailing terminal vertical edge, and wherein each sub-blade is skewed such that said cord line is rotated negative 45 degrees with respect the radius of said imaginary circle.

15. The wind turbine of claim 14, wherein said rotor further includes a central vertical support centered at said central vertical axis, said central vertical support has a circular cross-section of a second diameter; and further wherein each sub-blade has a quarter-circular profile with a radius approximately equal to 0.1 times said first diameter.

16. The wind turbine of claim 15, wherein each sub-blade has a length that is approximately equal to 0.16 times said first diameter.

17. The wind turbine of claim 16, further comprising:
a means to maintain the rotational momentum of said rotor.

18. The wind turbine of claim 17, wherein said means to maintain the rotational momentum of said rotor is coupled to said rotor for rotation therewith.

* * * * *